March 29, 1927.  1,622,625
E. E. BRAINARD
GASKET SEAL FOR LIQUID CONTAINERS
Filed Aug. 4, 1926
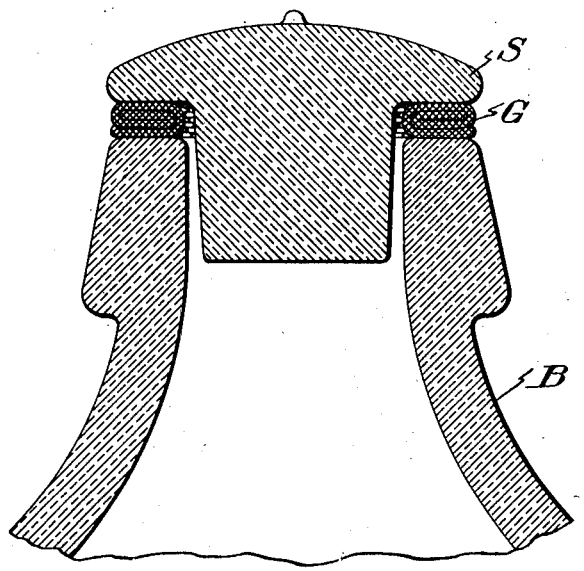
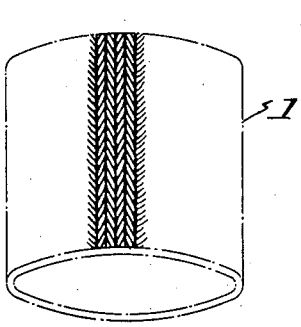
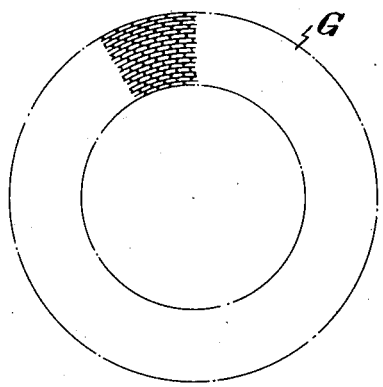
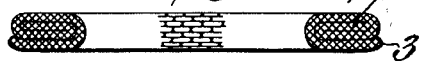
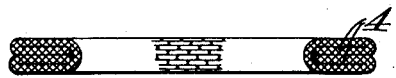
Inventor:
Everett E. Brainard,
By Byrnes Townsend & Brickenstein,
Attorneys.

Patented Mar. 29, 1927.

1,622,625

UNITED STATES PATENT OFFICE.

EVERETT E. BRAINARD, OF ARLINGTON, MASSACHUSETTS.

GASKET SEAL FOR LIQUID CONTAINERS.

Application filed August 4, 1926. Serial No. 127,108.

This invention relates to a gasket for the sealing of containers such as glass carboys or stoneware jars generally and is particularly designed for use in sealing acid containers.

As is well known, gaskets generally used of felted material are not well adapted for this purpose, as the material, if acid-proof, cannot be readily compressed to conform to the inequalities of the clay stoppers used on acid carboys generally and the fragile nature of the glass from which the containers are made necessitates the use of a soft acid-proof material readily compressed under the slight pressure applied to the stopper when sealed.

An object of this invention is to provide a gasket which is acid-proof, yet soft enough to be easily compressed.

Another object of this invention is to provide a knitted gasket made such that fraying of the edge thereof is avoided.

Still another object is to provide a gasket which may be readily stretched to fit the varying sizes of carboy necks.

Fig. 1 shows a form of my gasket applied to an acid bottle.

Fig. 2 shows a section of a knitted cylinder prior to forming the gasket therefrom.

Fig. 3 is a top plan of my gasket.

Figs. 4 and 5 are sections of modified forms.

In making up the gaskets I first knit a hollow cylinder 1 from asbestos yarn, as seen in Fig. 2. This cylinder is then formed into a gasket by expanding an end 2 and rolling the expanded end lengthwise of and externally of the cylinder. The opposite end 3 of the cylinder is preferably expanded to bring the raw edge of the fabric towards the outer periphery of the rolled annulus which when flattened has the form shown in Fig. 4.

In the modified form as seen in Fig. 5, the two ends of 4 of the cylinder are expanded and then folded back toward each other, and then the whole cylinder is bent outwardly to a U shape, thus confining the two ends between the legs of the U thus formed. In this modification, unraveling of the asbestos yarn is avoided, since the only exposed edges of the completed gasket are folds of the material, as well as providing a four ply soft, easily compressible gasket.

In use, the gasket is placed between any two abutting surfaces. As seen in Fig. 1, the acid bottle B has flanged neck in which glass or stoneware stopper S is placed. The gasket G is placed as shown and the stopper is wired or otherwise held in place on the bottle.

The gasket thus provided is impervious to acid, yet is pliable and flexible. Being formed of knitted yarn, there can be no fraying, as it is formed of a single strand, instead of having a warp and woof.

It is understood that the completed gasket or the material thereof may, if desired, be saturated, treated or incased with any waterproofing or preserving compound.

I claim:

1. In a shipping container for acids or the like, in combination, an acid bottle having an apertured neck, a stopper therefor, and a gasket interposed between said neck and said stopper, said gasket comprising a seamless cylinder of knitted fabric, turned back upon itself to provide a four-ply ring, one end of the fabric being contained within the turned-back gasket.

2. In a shipping container for acids or the like, in combination, an acid bottle having an apertured neck, a stopper therefor, and a gasket interposed between the neck and the stopper, said gasket comprising a seamless annulus of acid-proof fabric, turned back upon itself to position the one edge of the fabric within the interior thereof.

3. The method of making a ring gasket for liquid containers consisting of forming a hollow, knitted cylinder of asbestos yarn, rolling the fabric back upon itself the full length of the cylinder to thus form an annulus of at least four layers of asbestos fabric presenting in radial cross section the form of a spiral.

4. A one-piece seamless gasket comprising an annulus of knitted fabric, presenting in radial cross-section the form of a spiral.

In testimony whereof, I affix my signature.

EVERETT E. BRAINARD.